United States Patent

[15] 3,648,543

Fragnito

[45] Mar. 14, 1972

[54] VARIABLE SPEED TRANSMISSION

[72] Inventor: Frank A. Fragnito, 144 South Ninth East, Salt Lake City, Utah 84108

[22] Filed: July 6, 1970

[21] Appl. No.: 52,575

[52] U.S. Cl. ............................................74/681, 74/217
[51] Int. Cl. ......................................................F16h 37/06
[58] Field of Search......................................74/681, 217 CV

[56] References Cited

UNITED STATES PATENTS

| | | | |
|---|---|---|---|
| 1,111,466 | 9/1914 | Jackson | 74/217 CV |
| 2,705,892 | 4/1955 | Yeager | 74/217 CV |
| 2,801,547 | 8/1957 | Guibert | 74/217 CV |

*Primary Examiner*—C. J. Husar
*Attorney*—William S. Britt, C. Harvey Gold and David V. Trask

[57] ABSTRACT

A positive-drive, infinitely variable speed transmission has been invented. The variation in speed may range from zero to any multiple of the input speed. The rotational speed of the output shaft may be varied from zero to a desired speed of rotation in either a clockwise or counterclockwise direction. The novel transmission comprises a set of four cones arranged in pairs with each pair encircled by a drive chain which is driven by said cones. The center adjacent cones of each pair are in contact with one another through a gear which meshes with the drive chain to drive a shaft connected to an external gear in contact with a planetary gear attached to the input drive shaft. The input drive shaft also drives the cones, which in turn, drive the drive chain. By varying the distance between the center adjacent cones, the center gear in contact with the drive chains is driven at various speeds depending upon the position of the chain on the cones. A sliding tooth is engaged in a keyway in the surface of each cone to provide a drive means for driving the drive chain no matter what position the chain occupies on the surface of the cone. The separation between the center adjacent cones can be accomplished by manual or power assist means. The regulation of the distance between the center cones determines the direction and speed of the output shaft for a given speed of the input shaft.

11 Claims, 5 Drawing Figures

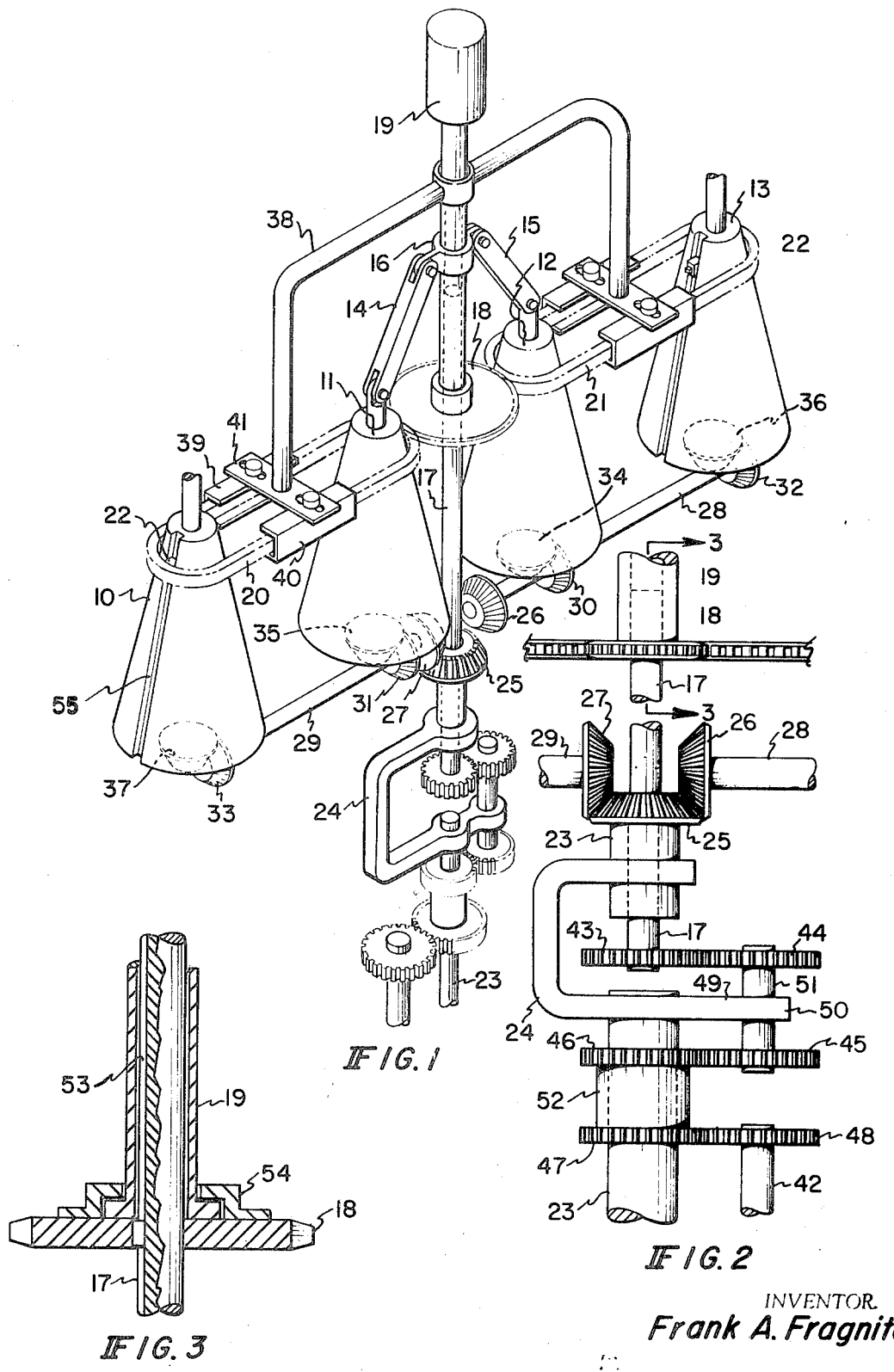

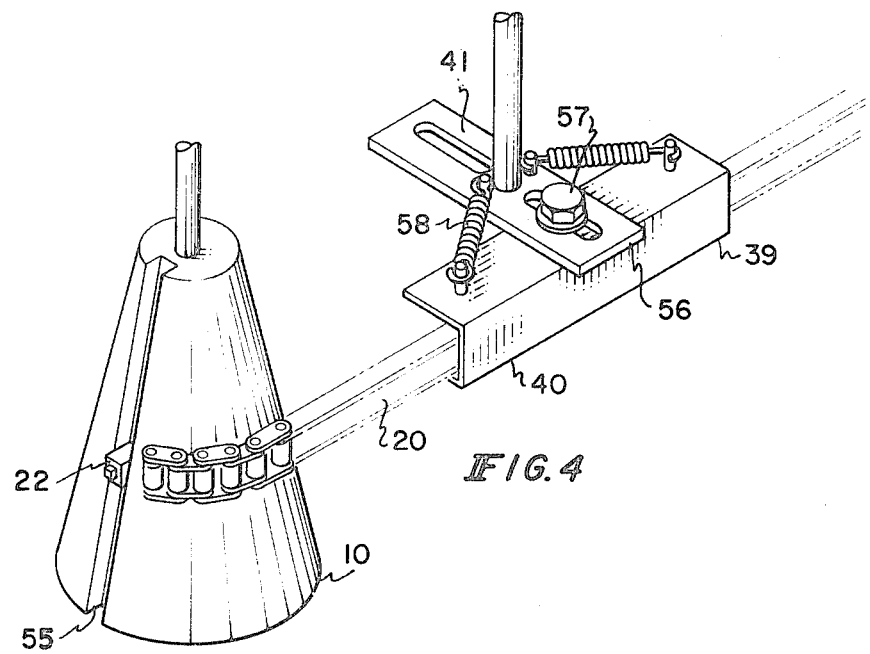
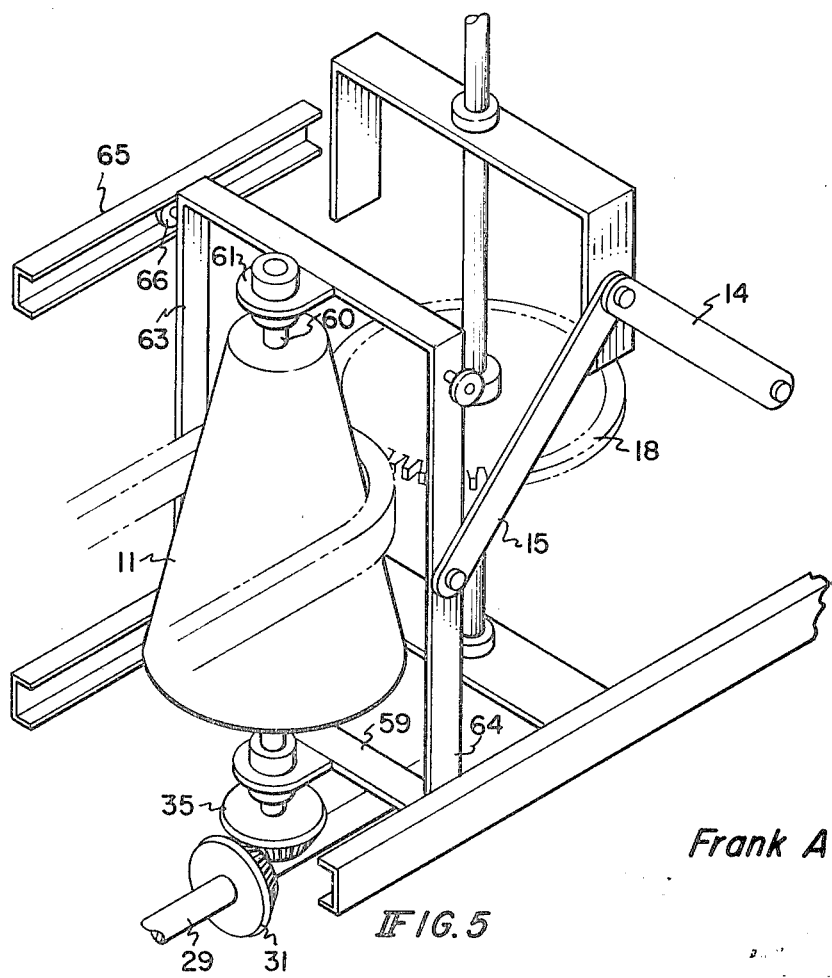

VARIABLE SPEED TRANSMISSION

BACKGROUND OF INVENTION

Variable speed transmissions are useful in a number of industrial applications. Many of these variable speed transmissions, however, depend upon a friction drive and are not reliable in situations of heavy loading. Infinitely variable, positive-drive transmissions manufactured by the Link-Belt Company are described in Mechanisms and Linkages by P. Chronis. These involve a pair of pulleys each with conically shaped flanges which can be adjusted to separate to allow the drive chain to ride lower or higher in the pulley. A unique chain connects the drive pulley with the output pulley. The chain links are composed of a bundle of steel leaves which may slide in relation to one another so that positive contact can be maintained with grooves extending radially from the center of each flange face to its periphery.

DESCRIPTION OF INVENTION

The instant invention comprises an infinitely variable speed transmission having a reverse and forward drive. The mechanism comprises a quartet of cones having their parallel axes falling in the same plane; said cones operating as a right and left pair with each pair encompassed by a continuous, flexible chain. The cones are driven in the same direction directly or indirectly by the input drive means. The center adjacent cones, that is the center cones of each pair, contact a cone gear which is engaged and driven by the flexible chain encompassing each pair of cones. The distance between the center adjacent cones may be varied by a mechanism interconnected with means which substantially simultaneously move each chain in a direction along the axis of each cone.

The cone gear disposed between the center adjacent cones is adapted to maintain direct contact with said chains regardless of the vertical position of the chain. The cone gear means drive an output gear contacting a planetary gear of different circumference, preferably greater than the cone gear, said planetary gear being rotated in an orbit about the output gear by a crank attached to the input power shaft. A second planetary gear rigidly attached to the same shaft as said first planetary gear contacts a freely turning gear journaled to the input shaft, said journaled gear in turn contacting a drive gear to drive the output shaft.

Further description of the invention is facilitated by reference to the following figures:

FIG. 1 is a perspective view illustrating the primary elements of the drive mechanism;

FIG. 2 is an elevational view illustrating details of the planetary gear system;

FIG. 3 is a partial sectional view of the cone gear;

FIG. 4 is a perspective view illustrating a cone and a chain guide; and

FIG. 5 is a perspective view illustrating a cone separating means.

The primary elements of the variable speed transmission of this invention are illustrated in FIG. 1 wherein four cones 10, 11, 12, and 13 are aligned such that their center axes are parallel to one another and all lay in the same vertical plane. The cones are divided into a right and left pair with the end cones 10 and 13 of each pair preferably being in a stationary position with reference to a frame. The center cones 11 and 12 are capable of being separated from one another to assume a position closer to their respective end cones. The center adjacent cones are translated horizontally by the movement of arms 14 and 15 which are attached to a housing 16 which may be manually moved upward or downward along the vertical shaft 17.

A cone gear 18 disposed on shaft 17 and keyed thereto, is attached by a tubular or cylindrical member 19 so that cone gear 18 may be moved axially along shaft 17. The cone gear 18 contacts a pair of roller chains 20 and 21, each continuous chain encompassing a pair of cones. The cones, by means of slidable tooth 22, drive the roller chains 20 and 21 which rotate the cone gear 18. All four cones rotate in the same direction, which preferably is in the same direction of rotation as the power input shaft 23 when drive gear 43 is smaller than planetary gear 44. Cone gear 18 rotates in an opposite direction from the cones.

The lower portion of drive shaft 23 is coupled by coupling means 24 to the upper portion of the drive shaft to drive a bevel gear 25 which drives bevel gears 26 and 27 to rotate shaft 28 and 29, causing bevel gears 30, 31, 32, and 33 to rotate. Bevel gears 32 and 33 may be rigidly attached to their respective shafts while bevel gears 30 and 31 are preferably keyed to their respective shafts so said gears 30 and 31 may slide axially along said shaft as cones 11 and 12 are moved laterally. The bevel gears keyed to shafts 28 and 29 cause the beveled gears on the cone axles in contact therewith to rotate, thereby turning the cones. Bevel gears 34, 35, 36 and 37 are attached to shafts which drive the respective cones. These shafts may be journaled to frame means both above and below the cones to maintain the cones in a vertical position and provide support for said cones. As indicated hereinabove, and as further illustrated in FIG. 5, adjacent cones 11 and 12 may be translated horizontally.

As cone gear 18 is moved vertically along shaft 17 it tends to move chains 20 and 21 vertically also inasmuch as the teeth of the cone gear engage the roller chains. As cone gear 18 is moved vertically the cones 11 and 12 are moved in a horizontal, complementary direction. In order to guide chains 20 and 21 as they travel vertically along the individual cones, chain guide means are provided. The chain guide means are connected to cylinder 19 by arm means 38. The chain guide means comprises a pair of channels 39 and 40 through which the chain passes. The channels are maintained in position with respect to one another by a plate 41 containing slots which permit the guide channels 39 and 40 to be displaced horizontally as the distance between linear segments of the chain increases as the chain moves down the cones. The chain guide means is illustrated in greater detail in FIG. 4.

The operation of the infinitely variable speed transmission of this invention may be described with reference to FIGS. 1 and 2. Cone gear 18 is rotated by rotation of cones 11 and 12. It is preferred that the diameter of cone gear 18 be greater than the smallest diameter of cones 11 and 12 and less than the greatest diameter of said cones. It is preferred therefore, that cone gear 18 at its uppermost position rotates at fewer revolutions per minute than the cones and that in its lowermost position, cone gear 18 rotates at a greater speed than the cones which it contacts. As is indicated hereinabove, it is preferred that the cones rotate at the same speed and direction as drive shaft 23 and that said cone rotation speed be constant.

In FIG. 2 the variation in speed and direction of output shaft 42 in respect to input shaft 23 may be illustrated. As indicated hereinabove, cone gear 18 slides axially along keyed shaft 17. Shaft 17 is rigidly attached to drive gear 43 which is caused to rotate in an opposite direction from input shaft 23. As illustrated in FIGS. 1 and 2 rotation of shaft input 23 in a clockwise position causes rotation of drive gear 43 to be in a counterclockwise direction. A preferred ratio between gears 43 and 44 is 1 to 2. In order to have a reverse direction for the transmission, it is preferred that gear 43 have a different circumference than 44; if gear 43 has the same circumference as gear 44, then no reverse direction is obtainable from the system.

For purposes of illustration, a gear ratio of 1 to 2 for gears 43 and 44 is utilized. The effect of the planetary gear system may be illustrated by assuming that gear 43 is being held motionless while drive shaft 23 rotates clockwise as viewed from its bottom end at a rational speed of one revolution per unit time, for example, 1 r.p.m. Rotation of drive shaft 23 at one r.p.m. causes planetary gears 44 and 45, connected by shaft 49 to the input shaft 23 and having their interconnecting shaft 51 rotating in bearing 50, to orbit gear 43 in a clockwise direction. Since gear 43 has one half the circumference of gear 44, the orbiting of gear 44 about gear 43 will cause gear 44 to rotate on shaft 51 one-half revolution clockwise for each orbital revolution. Rotation of gear 44 clockwise at 1 r.p.m. causes rotation of gear 45 about shaft 51 to be one-half r.p.m. clockwise also. The gear ratio between gear 45 and 46 is preferably one to one although it may other ratios as long as it is not the same ratio as that between gears 43 and 44. Orbital revolution of gear 45 at 1 r.p.m. causes gear 46 also to rotate clockwise at 1 r.p.m. However, the one-half revolution per minute of gear 45 about shaft 51 in a clockwise direction tends to drive gear 46 in a counterclockwise direction at one-half revolution per minute. Thus, the resultant effect on gear 45 under these circumstances is a clockwise rotation at one-half r.p.m. If the ratio between gears 47 and 48 is also 1 to 1 then the coupling 52 between gears 46 and 47 cause gear 48 to rotate at the same speed as gear 46 but in an opposite direction. Thus, gear 48 turns counterclockwise at one-half revolution per minute to drive output shaft 42 at one-half revolution per minute counterclockwise.

Although the mechanism illustrated in FIG. 1 does not have a position for zero rotation of cone gear 18, if adjacent cones 11 and 12 have a very small top diameter in relation to cone gear 18 then the rotational speed of cone gear 18, and consequently drive gear 43, will be very slow in relation to drive input shaft 23. As the cone gear 18 is moved down the shaft from its very uppermost position it will eventually reach a point at which the diameter of the cone gear 18 equals the diameter of cones 11 and 12. When this occurs gear 43 will rotate counterclockwise at 1 r.p.m. (assuming 1 r.p.m. clockwise rotation of input shaft 23). The counterclockwise rotation of gear 43 at 1 r.p.m. adds one-half r.p.m. about smaller gear 43, adds one-half r.p.m. clockwise rotation to gear 44 thus resulting in gear 44 rotating at 1 r.p.m. clockwise when gear 43 rotates at 1 r.p.m. counterclockwise and shaft 23, of course, rotating at 1 r.p.m. clockwise. The turning of gear 44 at 1 r.p.m. clockwise causes gear 45 to also rotate on its shaft at 1 r.p.m. clockwise which, because gears 45 and 46 are the same circumference permits gear 45 to walk around gear 46 because the orbital speed and the rotational speed of gear 45 are both 1 r.p.m. Thus, gear 46 does not move and consequently gear 48 does not turn and a zero output results.

As gear 18 moves down cones 11 and 12 from the zero position the diameter of the cones exceed that of gear 18. This will cause gear 18 to rotate faster than cones 11 and 12 (and shaft 23), thus causing gears 44 and 45 to rotate faster than 1 gear 18. This This causes rotation of gear 46 in a counterclockwise direction.

On examining FIG. 2 it can be seen that if the ratio between gears 43 and 44 is one to one no reverse capability results. However, when gears 43 and 44 are different diameters then a zero position is obtainable and a reverse capability results. If gear 43 is smaller than gear 44 then the direction of rotation of gear 43 should be opposite to the rotation of shaft 23. However, if gear 43 is larger than gear 44, then the direction of rotation of gear 43 should be the same as that of shaft 23 to attain a reverse capability. It is understood of course that the relationship of the diameter of cone gear 18 to the minimum and maximum diameters of the cone is important when gear 43 is smaller than gear 44. The minimum diameter of the cone should be less and the maximum diameter of the cone should be more than the diameter of cone gear 18. If a reverse capability is not required then these limitations do not apply.

In FIG. 2 if gear 44 is of smaller diameter than gear 43 for example, a gear ratio of 2 to 1 for gears 43 and 44, a reverse position can be obtained without the cones 11 and 12 having a larger diameter than cone gear 18. At a gear ratio of 2 to 1 for gears 43 and 44 a 1 r.p.m. clockwise rotation for shaft 23 when gear 43 is held stationary causes a 1 r.p.m. counterclockwise direction to be imposed on gear 46. At one-half r.p.m. clockwise rotation of gear 43 then gear 44 is turning 1 r.p.m. clockwise as is gear 45 so that gear 45 merely walks around gear 46 and no resulting rotation of gear 46 results. At 1 r.p.m. clockwise rotation of gear 43, gear 44 does not rotate on its axis nor does gear 45 so that gear 45 carries gear 46 in a clockwise rotation at 1 revolution per minute.

The partial sectional view in FIG. 3 illustrates the manner in which cone gear 18 is moved vertically along shaft 17. Shaft 17 has a keyway 53 which engages a key in gear 18 so that shaft 17 is driven by gear 18. The cylinder 19 is shown attached to gear 18 by a flanged end 53 on cylinder 19, which is encompassed within a cylindrical bearing 54 attached to cone gear 18. The bearing 54 rotates about and encompasses flange 53 so that any movement along the axis of shaft 17 by either gear 18 or cylinder 19 is translated one to the other. This is only one method of coordinating the axial movement of gear 18 along shaft 17 with horizontal movements of cones 11 and 12 and the vertical movement of chain guide 39. For example, a fork or yoke could enclose chain gear 18 so that gear 18 was within the two horizontal prongs of the yoke and the yoke connected to means for separating cones 11 and 12 and means for moving the chain guide in a vertical direction.

In FIG. 4 the novel arrangement for driving chains 20 and 21 is illustrated in a partial perspective view showing cone 10 with the sliding tooth 22 exposed. The tooth 22 slides in a keyway 55 so that the tooth 22 can move vertically along with the vertical movement of chain 20. The tooth 22 should slidably engage the keyway 55 but should not fit so loosely therein as to slide to the bottom of the keyway when the tooth 22 disengages chain 20, as occurs during each revolution of cone 10. The use of the slidable tooth enables the cone to engage the roller chain 20 whether the chain encircles the top or bottom of the cone. It is apparent that a sprocket cannot be utilized over the cone to maintain constant engagement of the chain for at least one-half the time for each revolution. At the base of the cone the sprocket would have to have a great many more teeth than a sprocket designed for the top of the cone.

It can be seen from FIG. 4 that a sliding tooth can engage the same link of chain whether the chain encircling the top of the cone or encircling the larger base of the cone. A pair of cones such as cones 10 and 11 of FIG. 1 act cooperatively inasmuch as at least one tooth member must engage chain 20 at all times. However, on FIG. 4 it can be seen that tooth 22 of cone 10 will only engage chain 20 for only approximately 180° of its 360° rotation. During the time tooth 22 of cone 10 is disengaged from chain 20 then a similar tooth in cone 11 will be engaging chain 20 and driving said chain. The tooth 22 must slide along the cone but must fit tightly enough in its slideway to prevent its falling to the cone base when it does not engage the chain.

In FIG. 4 the chain guide is also illustrated showing the chain channel 40 and the connecting plate 41 with an open slot 56 to accommodate a pin 57 attached to the channel 40. As the chain moves downward on the cone the distance between the linear portions of the chain widens so that the chains guide channels 40 must move farther apart thus causing pin 57 to slide in slot 56 to the extremity of the slot. As chain 20 moves upward on the cone the linear portion of the chain comes closer together so that it is necessary for the chain guide channels 40 to follow the chain. This is accomplished by having spring means 58 attached between the plate 41 and the chain channel to exert slight inward pressure of the channel 40 on the chain 20. The channel members 40 may overlap the chain 20 to the point where the chain contacts the cone. Other means for guiding the chain 10 of course can be utilized. The objective of the chain guide, of course, is to force the chain 20 downward or upward a desired amount in coordination with the lateral movement of the central adjacent cones.

In FIG. 5 a partial perspective view is shown illustrating means for coordinating the lateral movement of a central adjacent cone with the vertical or axial movement of cone gear 18. A cone 11 is attached to a frame member 59 through journal means so that the shaft extending from the bottom of cone 11 rotates in said frame member and passes therethrough to drive gear 35. The upper portion of a cone shaft 60 is journaled into a bearing 61 attached to an upper horizontal frame member 62. The frame comprises a pair of vertical members 63 and 64 to which arm 15 attaches. The frame members are designed to slidably engage channel members or guides 65 which are disposed substantially perpendicularly to the plane containing the cone plane. Thus, as vertical movement occurs on one end of arm 15 to cause the cone frame member to move laterally, the cone frame can slide within guide means 65 by means of rollers 66. As the cone 11 and cone frame move laterally gear 35 maintains engagement with gear 31 and causes gear 31 to slide along keyed shaft 29. Gear 35 and 31 may be placed in a common housing so that during movement in either direction along shaft 29 contact is maintained between these two gears. The gear housing may be attached to the lower frame member 59. Similar cone frames can be utilized to support end cones 10 and 13 although the frame for those cones does not need to slidably engage the guide ways 65 but can be rigidly attached thereto unless it is desired to move the end cones 10 and 13 in a direction opposite to the movement to the central adjacent cones 11 and 12. This may be done, however, it is preferred to maintain the outermost cones in a stationary position.

The variable speed drive of this invention may be utilized to give an infinitely variable change of speed of either reducing or magnifying nature. In FIG. 2, if gear 43 is smaller in diameter than gear 44, unless the ratio between the diameter of the cone base to gear 18 is greater than the ratio between gears 43 and 44 then a reducing gear ratio results. If gear 18 has a diameter intermediate of the smallest and largest diameters of the cone and the ratio between gears 45 and 46 is one to one and between gears 47 and 48 is one to one, a reducing effect is achieved which has a variable speed from zero to about one-half the speed of the input shaft for either direction of rotation for the output shaft 42. This can be altered by altering the gear ratios between gears 47 and 48, for example. By increasing the diameter of gear 47 in relation to gear 48 the capability of a given variable speed transmission can be changed from a reducing ratio to a magnifying ratio.

Although the invention has been described hereinabove with reference to specific embodiments it is understood that it is not to be limited solely thereto but to include all the variations and modifications falling within the scope of the appended claims.

I claim:
1. A variable speed, forward and reverse drive transmission comprising:
    a. frame means,
    b. four substantially identical cones having their parallel axes falling in the same plane, said cones operating in pairs with all cones interconnected to rotate in the same direction,
    c. a pair of continuous flexible chains, each chain positioned about a pair of interconnected cones and driven by drive means connected to said cones,
    d. means for varying the distance separating adjacent cones and simultaneously moving each chain in a longitudinal direction along the surface of said cones,
    e. cone gear means disposed between said adjacent cones and in drive contact with each chain encompassing said cones, said gear means adapted with said chairs as said chairs are positioned longitudinally along the surface of said cones,
    f. said cone gear means driving an output gear contacting a first planetary gear of different circumference driven by an input power shaft which drives said cones,
    g. a second planetary gear rigidly attached to the same shaft as said first planetary gear,
    h. a journaled gear freely turnable about said power input shaft and in contact with said second planetary gear, and
    i. a drive gear contacting said journaled gear and driving a power output shaft.
2. The transmission of claim 1 wherein the cone gear means has a diameter intermediate of the minimum and maximum diameter of said cones.
3. The transmission of claim 1 wherein the output gear driven by said cone gear has a smaller diameter than said first planetary gear.
4. The transmission of claim 1 wherein the second planetary gear and said journaled gear have the same diameter as said first planetary gear.
5. The transmission of claim 1 wherein the chain drive means connected to said cones comprises a single tooth slidably disposed in a channel extending longitudinally along the surface of each cone.
6. The transmission of claim 1 wherein the means for varying the distance separating said adjacent cones comprises a pair of arms connected at one extremity to said cones and at the other extremity commonly to an adjustable member which is movable vertically, said member located above said cone gear and movable along the same axis as said cone gear, said member being connected to said cone gear to move vertically with said cone gear.
7. The transmission of claim 6 wherein said adjustable member is connected with chain guides at least partially enclosing the portion of said chains extending between a pair of cones, said chain guides adapted to assist said chains in moving longitudinally along said cones.
8. The transmission of claim 1 wherein said cones are each driven by a bevel gear in contact with a bevel gear driven by one of a pair of horizontal shafts, one horizontal shaft driving a pair of cones, said horizontal shafts being driven by bevel gears in contact with a bevel gear attached to said drive shaft.
9. The transmission of claim 3 wherein the beveled gears driving said cones are disposed to cause said cones to rotate in the same direction as the input shaft.
10. The transmission of claim 8 wherein the output gear driven by said cone gear has a larger diameter than said first planetary gear and said beveled gears are disposed to cause said cones to rotate in the opposite direction to said input shaft.
11. The transmission of claim 1 wherein the means for varying the distance separating adjacent cones is adapted to maintain a set spacing between said adjacent cones.

* * * * *